ically, in the same direction. Near one end of drum 1 there is an annular rib or bridge, 15, constituting means for fixing an approximate normal thickness of the liquid-layer in the machine; and beyond this bridge there is a discharge outlet or outlets for the liquid. Such liquid discharge outlets may be in either the periphery or the head of the drum, and in the drawings I have shown two such openings, 16 and 17, one in the head 2 of the drum and the other in its periphery, either one of which may be used as preferred or as the quality of the material treated may make advisable; the opening not to be used being closed by suitable means, as for example the screw-plug 18. Near the other head of the ma-

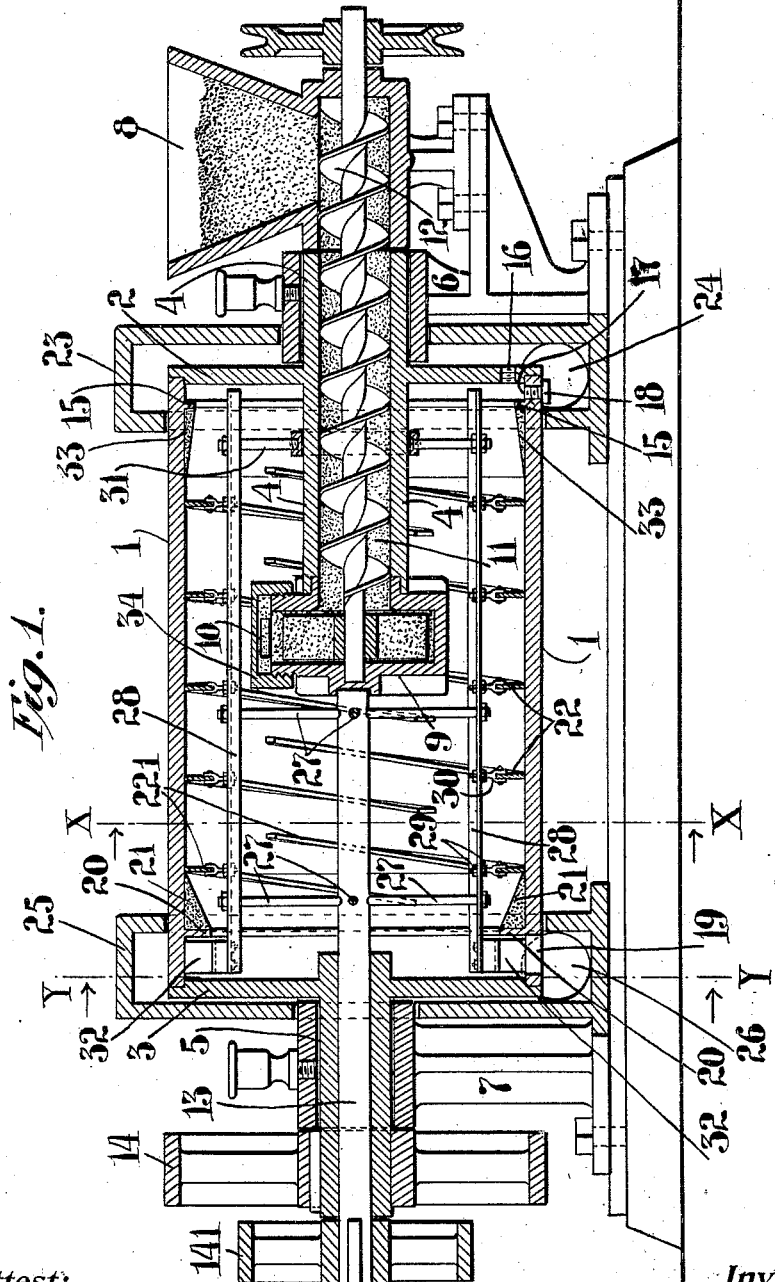

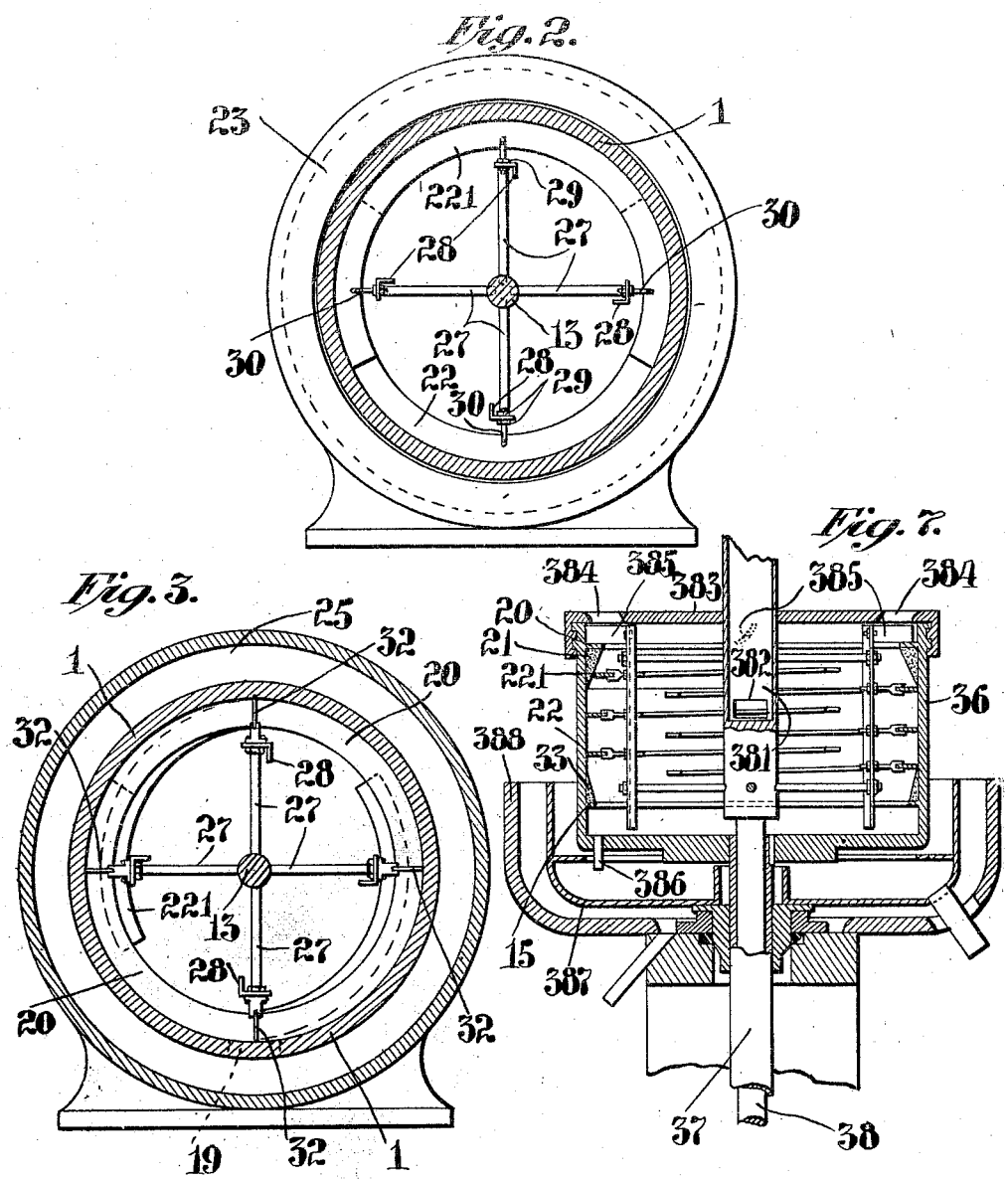

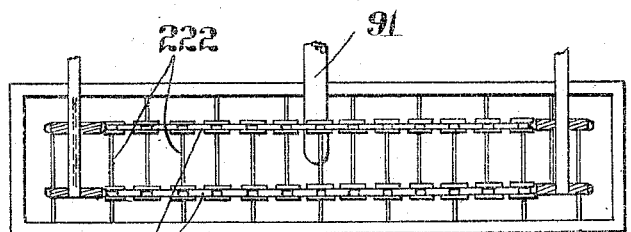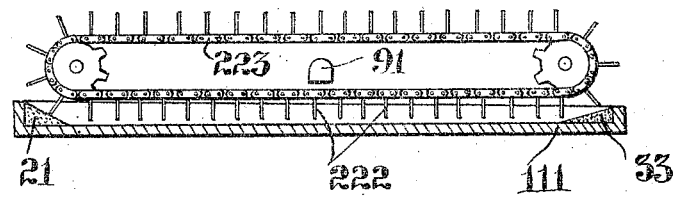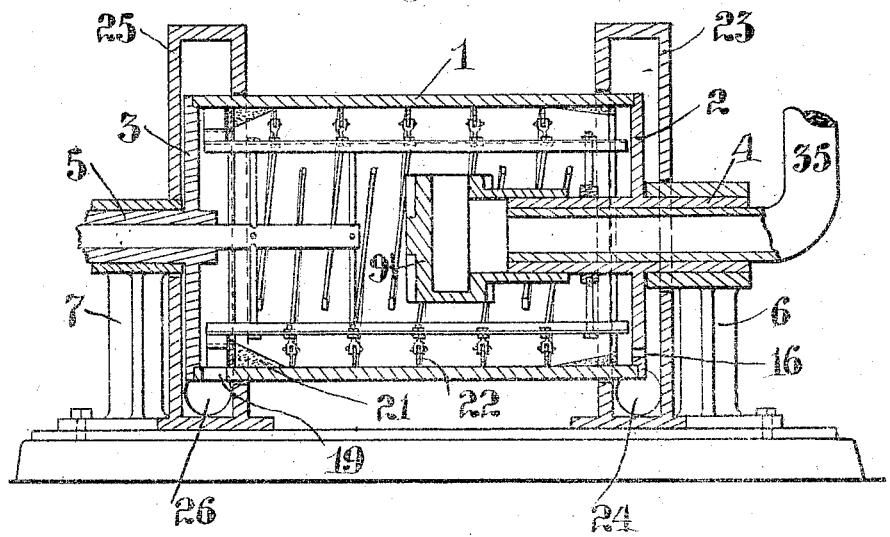

UNITED STATES PATENT OFFICE.

JOHN J. BERRIGAN, OF EAST ORANGE, NEW JERSEY, ASSIGNOR TO JOHN BERNSTROM, OF STOCKHOLM, SWEDEN, AND FRANCIS J. AREND, OF NEW YORK, N. Y.

APPARATUS FOR SEPARATING LIQUIDS AND SOLIDS.

1,005,800.  Specification of Letters Patent.  Patented Oct. 17, 1911.

Application filed February 17, 1908. Serial No. 416,298.

*To all whom it may concern:*

Be it known that I, JOHN JOSEPH BERRIGAN, a citizen of the United States, residing at East Orange, in the county of Essex and State of New Jersey, have invented a certain new and useful Apparatus for Separating Liquids and Solids; and I do hereby declare the following to be a full, clear, and exact description of the same, such as will enable others skilled in the art to which it appertains to make and use the same.

My invention relates to apparatus for separating liquids and solids through the agency of "centrifugal force" and comprises means for converting a body of mixed solid and liquid materials into an annulus, and for moving the solid material progressively toward a discharge opening at one end of the annulus and the liquid toward a discharge opening at the other end of the annulus, together with means for continuously supplying the mixture of solid and liquid materials to said annulus; and comprises also other features hereinafter described and more particularly pointed out in the appended claims.

The objects of my invention are to separate liquids and solids efficiently, particularly those mixtures of liquids and solids which, because of the fine subdivision of the solid material, its slimy or slippery nature, its close approximation in specific gravity to that of the liquid, or other reason, are very difficult to separate, or even practically impossible to separate efficiently by means such as ordinarily used heretofore; to improve and simplify separating apparatus adapted for such materials, and render the same of large capacity within relatively small dimensions and with moderate speeds of rotation, to dry the solid material until only a very small per cent. of liquid, if any, remains therein, to avoid unnecessary agitation of the mixture during the separation, to provide ample space, within relatively small dimensions, for the separation to occur, and generally to make the apparatus highly efficient for the purpose and capable of continuous operation.

The accompanying drawings illustrate apparatus constructed in accordance with my invention.

In said drawings: Figure 1 shows a vertical axial section of one form of centrifugal separator embodying my invention; Figs. 2 and 3 show transverse vertical sections of said apparatus on the lines X—X and Y—Y respectively; Figs. 4 and 5 are diagrammatic views showing the apparatus as it might be if "developed", Fig. 4 showing a plan view and partial section, and Fig. 5 a longitudinal vertical section. Fig. 6 shows a longitudinal section of a separator comprising alternative means for adjusting the point of delivery of the material acted on. Fig. 7 shows a vertical section of a vertical type of machine operating on the same principle as the horizontal machines of Figs. 1 and 6.

In the drawings, 1 designates a separating cylinder or drum having heads 2 and 3 and journals 4 and 5 mounted in bearings in standards 6 and 7 whereby the drum is mounted for rotation. Both of journals 4 and 5 are hollow, journal 4 having within it a supply-passage leading from a hopper 8 to a head 9 having a discharge opening 10; there being, in such supply passage, 11, and in the corresponding portion of the feed-hopper, 8, suitable conveying means, such as the screw conveyer 12, whereby material may be fed positively from said hopper to passage 11 and thence delivered through discharge-opening 10 into the interior of drum 1. Within the other journal, 5, of the drum, is a shaft 13 projecting into the interior of the drum and provided with the conveying-means or scrapers hereinafter referred to. Upon the extended end-portion of journal 5 is a belt-wheel 14 constituting means for rotating drum 1; and upon the outer end of shaft 13 is a belt-wheel 141 constituting means for rotating said shaft. The drum 1 and shaft 13 will normally rotate at different speeds; but, preferably, in the same direction. Near one end of drum 1 there is an annular rib or bridge, 15, constituting means for fixing an approximate normal thickness of the liquid-layer in the machine; and beyond this bridge there is a discharge outlet or outlets for the liquid. Such liquid discharge outlets may be in either the periphery or the head of the drum, and in the drawings I have shown two such openings, 16 and 17, one in the head 2 of the drum and the other in its periphery, either one of which may be used as preferred or as the quality of the material treated may make advisable; the opening not to be used being closed by suitable means, as for example the screw-plug 18. Near the other head of the machine there is a discharge-opening 19 for solids, and between this opening and the main portion of the interior of drum 1 there is an annular rib or bridge 20 having a height greater than the normal height of the liquid-layer in the drum as fixed by bridge 15 or discharge-opening 16. Bridge 20 will cause a conical ring 21 of the solid material being separated to form adjacent to it, and up this conical ring, and so above the level of the liquid, the solid material will be forced by the conveyer blades 22 and 221 on shaft 13 above mentioned.

In my Patent No. 834,043, dated Oct. 23, 1906, I have shown a centrifugal separator comprising a conical drum, in the larger end of which the liquid accumulates and overflows through a discharge opening, while the solid material is fed along the inclined periphery of the drum toward a discharge opening at its smaller end. In many mixtures of liquid and solid materials, for example, in mixtures containing finely divided precipitates or containing liquids of strong emulsifying power from which solids are not readily separated, as, for instance, caustic soda solution, the solid material is so finely divided, or slimy, that it is difficult or impracticable to force it away from the liquid and up along the surface of a drum having even very slight taper, until the liquid has been so far removed from it that it is dry, or nearly so. For this reason the drum of the machine of the present case is substantially cylindrical; i. e., has practically no taper whatever; and it is not until the solid material has been freed from the greater part of its liquid that it encounters the conical ring 21 and is forced up thereby toward the axis of the drum and so toward the discharge outlet 19.

At the liquid end of the machine there is an annular hood 23 to receive the discharged liquid; said hood having an outlet 24. At the solid end of the machine there is another annular hood, 25, to receive the discharged solid; said hood having an outlet 26.

For feeding the solid material along the periphery of the drum, as the latter rotates, the helical conveyer blades 22 and 221 on shaft 13 are provided. For carrying these blades, said shaft is provided with radial arms 27 carrying angle-iron strips 28, on which are mounted, (and secured by adjusting-nuts 29,) the screws 30 carrying the said blades 22 and 221. Since the strips project past the discharge head 9, these ends of the strips 28 may be supported by a spider 31 rotatively mounted on journal 4.

The conveyer blades 22 sweep as close to the periphery of the drum as practicable when, as is usually the case, the solid material is somewhat heavier than the liquid material and so forms the outer layer of the annulus, of material treated, against the sides of the drum; but blades 221 (which are the blades rotating within the region of the cone 21 to be formed and maintained) are inclined inward progressively, so forming a screw conveyer of gradually decreasing diameter corresponding to the intended slope of cone 21. It is obvious that by adjusting the angle of incline of blades 221 and the point at which said blades begin to incline inward, the length and pitch of the inwardly-inclined surface of cone 21 may be varied as described. Blades 32 upon the angle irons 28 serve to sweep the solid material around the drum into the discharge opening 19, and so prevent accumulation of the solid material at this end.

The conveyer blades 22 and 221 are not each complete spirals or helices, but each comprises a portion only of a turn, usually between 200 and 300 degrees, the ends of adjacent blades overlapping, as clearly shown in Figs. 2 and 3. The result of this is that the blades form, with the sides of the drum 1, a zigzag passage for the flow of the liquid, whereby the liquid in passing from, say, the cone 21, to the liquid discharge opening, follows a course the length of which is many times that of the distance, in a direct line, from cone 21 to said discharge opening; and the length of this zigzag may be increased or decreased as desired by increasing or decreasing the number of conveyer blades 22 and their pitch and by increasing or decreasing the extent of lapping of adjacent blades. That such zig-zag passage is formed will be seen by reference to the diagrammatic views, Figs. 4 and 5, which may be considered to be views of the machine of Figs. 1, 2 and 3, "developed". The drum 1 then becomes a trough 111, and the conveyer blades 22 become blades 222 movable lengthwise of this trough by means of sprocket chains 223, and overlapping respectively as do blades 22, so dividing the trough into a zigzag passage. The supply head 9 becomes a supply pipe 91 arranged to discharge into the trough. It will be obvious that in such an apparatus, which is in effect a settling apparatus, the length of the zigzag passage is determined by the number of the blades 222 and the extent of overlap of the blades.

Centrifugal separating apparatus such as shown in Figs. 1, 2 and 3, is in principle the same as the trough apparatus shown in Figs. 4 and 5, except that for gravity, the only force tending to produce separation of solids and liquids in such trough apparatus, is substituted the vastly more powerful "centrifugal force"—the power of which is determined by the speed at which the drum is rotated, i. e., the peripheral speed of the drum. When the drum is rotating, the material acted on is held out against its sides by centrifugal force, and the blades 22 and 221, being higher than the maximum depth of the annulus of material so formed, the liquid can reach the discharge opening, 16 or 17, only by flowing backward, zigzag fashion, between the blades. This is important, for it provides, within a drum of convenient length and weight, a settling passage of any length desired, so affording ample opportunity or time for the separation of the liquid from the solid matter; the solid matter being forced onward steadily toward the end having the discharge outlet 19, the liquid being displaced by the continually advancing layer of solid material and caused to flow back toward the liquid discharge outlet, 16 or 17. The action which takes place is, in principle, a settling action; but owing to the magnification, under the influence of centrifugal force, of the effect of the difference of specific gravity between the liquid and the solid material, the separation takes place relatively rapidly and perfectly, whereas in a trough apparatus such as shown in Figs. 4 and 5 it might take place very slowly if at all. In any settling operation, the amount of settling which takes place is proportional to the time afforded. It is a compound function of the force causing the settling (whether that force be gravitation or whether it be "centrifugal force"), and of the time during which any particular portion of the material acted upon is subjected to the action of that force.

One important feature of the present invention is that by means of it any desired length of time may be afforded for the settling, the liquid, in flowing through the circuitous pathway formed by the blades 22, being given ample time for the deposition of solids.

It is clear that, (omitting for the present consideration of the effect of constant supply of the mixture to be treated), at one end of the machine there will be dry or nearly dry solid material, and at the other end of the machine there will be liquid containing no, or very little, solid material; and that between these two extremes there will be, progressively, all intermediate ratios of mixture of the liquid and the solid material. It is clearly disadvantageous to deliver the mixture of liquid and solid material into drum 1 at a point where the solid material will, otherwise, be nearly dry, or, on the other hand, to deliver the mixture at a point where the liquid will, otherwise, be free, or nearly free, from solid material. Therefore, according to my invention, I endeavor to deliver the mixture to be treated at the point, in the drum, where the composition of the annulus is, normally, the same as that of the mixture supplied. The material, if supplied at such point, does not in any way disturb the operation of separation, the resulting liquid being as free from solid matter as if there had been no addition of solid matter, and the resulting dry solid matter being as dry as if there had been no addition of liquid, during the brief interval that it takes any particular particle of liquid or solid to travel from the "neutral" point (where the mixture is delivered as described) to its respective outlet. I believe it to be desirable to deliver the mixture at this neutral point in all cases where the mixture to be treated is one the constituents of which separate with difficulty, if at all, under ordinary conditions, and where the specific gravities of the materials are nearly the same. The point at which the mixture is delivered may be varied as desired, in various ways; for instance, by changing the length of that portion of the hollow journal 4 which projects into the drum 1. Or, as shown in Fig. 1, the discharge orifice 10 may be in the side of a cap 34 mounted on head 9 and arranged to be rotated to vary the position, lengthwise of the drum, of said discharge orifice. Or, the head may be caused to slide back and forth on the journal 4, as shown in Fig. 6, where said head, here numbered 91, is adjustable lengthwise over journal 4.

In some cases, the point of delivery of the mixture will be quite near the "solid" end of the machine, and in others it will be quite near the "liquid" end of the machine. This will depend upon the particular characteristics of the mixture, such as the relative proportions of solids and liquids present, the relative ease with which the separation is effected, etc. But when the ingredients of the mixture treated differ considerably in specific gravity, and separate readily by settling except for the proportion of liquid normally held by capillarity, adhesion, or like phenomenon, it is not so important, and may not be desirable, to supply the mixture at the "neutral" point. In general, the qualities of each particular mixture to be handled need to be considered to determine the best point at which to discharge the mixture into the annulus.

It is desirable, in most cases, to avoid disturbance of the annulus of solid material by the impingement against it of the mixture discharged from head 9. To this end it is desirable to check the radial flow near the side of the drum. Providing the head 9 with a closed end and lateral discharge opening 10, as in Fig. 1, substantially accomplishes this, the radial flow of the mixture being checked as said material impinges against the cap 34. The material issuing from opening 10 strikes against the annulus with far less violence than if the material passed direct from the supply passage, as in Fig. 6.

It will be noted that the conveyer blades 22 and 221 operate with practically no stirring and agitation of the material treated. In some cases it has been found that, unless special care be taken to avoid agitation of the mixture by the conveying device used, this agitation neutralizes to a great extent the separating influence of centrifugal force.

In some cases, the mixture may be fed into the machine without use of a feed conveyer 12. In such case, the supply pipe may be led through the hollow journal 4 to near the head 9, as indicated in Fig. 6, in which 35 designates such supply pipe.

In principle, it is substantially immaterial whether my machine be set horizontally, or vertically, or in any other position; gravity having, as compared with centrifugal force, very little effect on the annulus of material acted on. Mechanical considerations, however, usually limit the desirable or permissible height of a vertical machine, so that for large machines the horizontal arrangement is in general preferable. Fig. 7 shows a vertical machine, comprising a bowl or drum, 36, arranged to be rotated by a hollow shaft 37. Inside this shaft is another, 38, provided with a hollow upper portion 381 adapted to form a supply passage, and having a discharge port 382. On this shaft are mounted the arms carrying the screw conveyer blades, 22 and 221. The drum is provided with shoulders 15 and 20 adapted to cause formation of cones 33 and 21, as in the horizontal machine. In the upper head, 383, of the drum there are discharge openings 384, and blades 385 carried by the conveyer sweep the solid material passing over cone 21 into these openings, from which the material is projected by centrifugal force. Liquid escapes from the lower end of the drum, through a short pipe 386 into a pan 387; said pan being located in a cup 388 by which any splashed liquid or other material not otherwise caught is received. The operation of this vertical machine is obviously much the same as that of the horizontal machine shown in Fig. 1, and therefore I will describe only the operation of the horizontal machine, which is as follows: The drum 1 being in rotation, the mixture to be separated is fed from the hopper 8 by the conveyer 12 and delivered through opening 10 into the interior of the drum, preferably, according to my invention and process, at or near the point where the composition of the material of the annulus formed is about the same as that of the mixture supplied. The material so introduced is put in rotation as it strikes the side of the drum, (or the annulus of material against such side), and the separating action begins, the material so supplied spreading out into the said annulus, the solid material (which under the influence of centrifugal force forms so stiff a mass that it may be moved forward in whole or in part by the blades 22) being moved by said blades toward the left-hand end of the machine (as viewed in Fig. 1); the liquid being displaced by the solid material so advanced, and caused to flow toward the right-hand end of the machine. When the cone 21 is reached, the solid material is forced up this cone, above the level of the liquid, any considerable proportion of liquid remaining in it draining off immediately and almost entirely, under the influence of centrifugal force, so that the solid material passes over bridge 20 practically or entirely dry. The liquid, on the other hand, flowing back as it does through the zig-zag passage formed by the segmental overlapping blades, has ample opportunity for depositing any considerable traces of the solid material carried by it, and therefore leaves the liquid outlet practically free from solid material. The cone 33 of solid material which may form adjacent the bridge or rib 15 is kept from growing beyond a definite thickness by the conveyer blades 22, which scrape off any excess and feed it toward the "solid" end of the machine.

The process carried out as above described by the apparatus herein described, is claimed in a divisional application filed May 11, 1908, Sr. No. 432,223.

What I claim is:—

1. In a centrifugal separator, a substantially cylindrical rotating drum adapted to form and maintain an annular layer of settled solids and liquid therein while discharging liquid from the surface of said annular layer at one end of said drum, means for causing the settled solids to travel to the other end of said drum and to discharge there at a point nearer the axis of rotation than the surface of said liquid, and means for introducing wet material at a mid portion of said annular layer.

2. In a centrifugal separator, a substantially cylindrical rotating drum adapted to form and maintain an annular layer of settled solids and liquid therein along substantially the entire effective separating portion of its length while discharging liquid from the surface of said annular layer at one end of said drum, means for creating a tortuous passage for the movement of the settled solids in said annulus and for moving the solids through said tortuous passage to the other end of said drum and to discharge there at a point nearer the axis of rotation than the surface of said liquid, and means for supplying wet material to be separated at a mid portion of such annular layer.

3. In a centrifugal separator, a rotating drum adapted to form and maintain an annular layer of settled solids and liquid therein, and means for moving solid material in said annulus toward one end thereof and for causing liquid in said annulus to move in a tortuous path toward the other end thereof, comprising segmental lapping conveyer blades and means for causing them to move relatively to the revolving drum.

4. In a centrifugal separator, a rotating drum adapted to form and maintain an annular layer of settled solids and liquid therein, and having separate outlets for solids and for liquid relatively distant from each other, and a conveyer comprising segmental lapping conveyer blades, intermediate said outlets at a mid portion of such annular layer.

5. In a centrifugal separator, a rotating drum adapted to form and maintain an annular layer of settled solids and liquid therein, and having separate outlets for solids and liquid relatively distant from each other, means for delivering wet material into said annular layer, and a conveyer comprising segmental lapping conveyer blades, intermediate said outlets.

6. In a centrifugal separator, a rotating drum adapted to form and maintain an annular layer of settled solids and liquid therein, and having separate outlets for solids and liquid and, in front of the outlet for solids, a bridge higher than the normal depth of said annular layer, and a conveyer comprising segmental lapping conveyer blades, intermediate said outlets.

7. In a centrifugal separator, a rotating drum adapted to form and maintain an annular layer of settled solids and liquid therein, and having separate outlets for solids and liquid and, in front of the outlet for solids, a bridge higher than the normal depth of said annular layer, and a conveyer comprising segmental lapping conveyer blades, intermediate said outlets, the blades near the solid outlet having a taper corresponding to the slope of a conical annulus of solid material to be created and maintained next said bridge.

8. In a centrifugal separator, a rotating drum adapted to form and maintain an annular layer of settled solids and liquid therein, and having separate outlets for solids and liquid and, in front of the outlet for solids, means for forming a conical annulus of material treated, the height of such annulus being greater than the normal thickness of the annular layer of material treated, and means for moving solid material up said conical annulus toward the coresponding outlet.

9. In a centrifugal separator, a rotating cylindrical drum adapted to form and maintain an annular layer of settled solids and liquid therein, and means for moving solid material in said annulus toward one end thereof and for causing liquid in said annulus to move in a tortuous path toward the other end thereof, comprising segmental lapping conveyer blades and means for causing them to move relatively to the revolving drum.

10. In a centrifugal separator, a rotating cylindrical drum adapted to form and maintain an annular layer of settled solids and liquid therein, and having separate outlets for solids and for liquid relatively distant from each other, and a conveyer comprising segmental lapping conveyer blades, intermediate said outlets.

11. In a centrifugal separator, a rotating cylindrical drum adapted to form and maintain an annular layer of settled solids and liquid therein, and having separate outlets for solids and for liquid relatively distant from each other, a bridge in front of the liquid outlet whereby the normal level of liquid is fixed, means for moving solids toward the outlet for solids and for causing liquid to move in a circuitous course toward the liquid outlet, and means for delivering wet material at a mid point of said annular layer.

12. In a centrifugal separator, a rotating drum adapted to form and maintain an annular layer of settled solids and liquid therein, and having separate outlets for solids and for liquid, and a conveyer within said drum comprising a rotating shaft having arms projecting therefrom, longitudinal strips secured to said arms and spaced lapping helical blades secured to said strips.

13. In a centrifugal separator, a rotating drum adapted to form and maintain an annular layer of settled solids and liquid therein, and having separate outlets for solids and for liquid, and a conveyer within said drum comprising a rotating shaft having arms projecting therefrom, longitudinal strips secured to said arms and lapping helical blades secured to said strips and adjustable toward and from the axis of rotation.

14. In a centrifugal separator, a rotating drum having an annular bridge at either end, one of said bridges being higher than the other, and having a liquid discharge orifice receiving liquid from beyond the lower bridge, means for causing separated solids to travel toward and over the higher bridge and means for feeding wet material to be separated to a mid-portion of the drum.

15. In a centrifugal separator, a rotating drum having an annular bridge at either end, one of said bridges being higher than the other, and having a liquid discharge orifice receiving liquid from beyond the lower bridge, means for causing separated solids to travel toward and over the higher bridge and for causing separated liquid to travel in a circuitous path toward and over the lower bridge and means for feeding wet material to be separated to a mid-portion of the drum.

16. In a centrifugal separator, a rotating drum having an axial supply passage and a communicating radial discharge passage having means for checking radial movement of the material therefrom, and means for feeding solid material along the side of such drum.

17. In a centrifugal separator, a substantially cylindrical rotating drum adapted to form and maintain concentric annular layers of solids and liquids extending over substantially the entire effective separating portion of its length and having an axial supply passage provided with means for regulating longitudinally the point of delivery of the material.

18. In a centrifugal separator, a rotating drum having an axial supply passage provided with a right-angled termination, said termination provided with means preventing the direct radial escape of the material, and having a lateral escape opening.

In testimony whereof I affix my signature, in the presence of two witnesses.

JOHN J. BERRIGAN.

Witnesses:
H. M. MARBLE,
FRANK E. RAFFMAN.